United States Patent [19]

Leonard et al.

[11] Patent Number: 4,619,804
[45] Date of Patent: Oct. 28, 1986

[54] FABRICATING OPTICAL RECORD MEDIA

[75] Inventors: Eric M. Leonard, Rochester; Robert V. Fister, Hilton; James R. Pledger, Rochester, all of N.Y.

[73] Assignee: Eastman Kodak Company, Rochester, N.Y.

[21] Appl. No.: 723,410

[22] Filed: Apr. 15, 1985

[51] Int. Cl.$^4$ ............................................. B29C 33/42
[52] U.S. Cl. .................................... 264/220; 756/643; 756/272.8; 756/275.5; 264/1.3; 264/2.5; 264/22; 264/25; 264/81; 264/106; 264/132; 264/265; 264/310; 430/5; 430/140; 430/269
[58] Field of Search ............... 264/23, 22, 106, 107, 264/1.3, 2.5, 220, 132, 25, 81, 265, 310; 430/269, 140, 5; 156/643, 272.8, 275.5

[56] References Cited

U.S. PATENT DOCUMENTS

| 3,600,243 | 8/1971 | La Rocque et al. | 156/3 |
| 3,794,536 | 2/1974 | Muska | 156/11 |
| 4,112,030 | 9/1978 | Kremzow | 264/106 |
| 4,157,931 | 6/1979 | Bricot et al. | 264/22 |
| 4,275,091 | 6/1981 | Lippits et al. | 427/53.1 |
| 4,374,077 | 2/1983 | Kerfeld | 264/22 |
| 4,382,103 | 5/1983 | McQuaid | 264/2.5 |
| 4,407,880 | 10/1983 | Terao et al. | 264/22 |
| 4,421,593 | 12/1983 | Curtis et al. | 156/643 |
| 4,435,343 | 3/1984 | Ando et al. | 264/22 |
| 4,477,328 | 10/1984 | Brocksema et al. | 264/22 |
| 4,478,768 | 10/1984 | Takeoka | 264/107 |
| 4,482,511 | 11/1984 | Komatsubara | 264/22 |
| 4,556,628 | 12/1985 | Greschner et al. | 430/314 |

FOREIGN PATENT DOCUMENTS

| 57-24042 | 2/1982 | Japan | 264/107 |
| 57-88504 | 6/1982 | Japan | 264/106 |
| 59-178636 | 10/1984 | Japan | 264/106 |
| 2021798 | 12/1979 | United Kingdom | |

OTHER PUBLICATIONS

"Manufacture of Laservision Discs by a Photopolymerization Video Process," Journal of Radiation Curing, Jan. 1984, pp 2-9.
"Digital Magnetooptic Disk Drive," Applied Optics, vol. 23, No. 22, Nov. 15, 1984, pp. 3972-3978.
"Magneto-Optical Disk Substrate by Reactive Ion Etching," J. Hirokane et al., at 31st Meeting of Applied Physics Society of Japan, 1984, 2a-A-4.

Primary Examiner—Jeffery Thurlow
Attorney, Agent, or Firm—William C. Dixon

[57] ABSTRACT

A process for making at least a single-faced, write and/or read optical disk having a sub-layer with a smooth or high-resolution featured surface and the opaque, substantially flat substrate includes the steps of interjecting between the opaque, substantially flat substrate and a transparent, highly polished or featured master mold, a thin layer of viscous composition which is radiation-curable to a solid plastic without undergoing significant shrinkage. The layer of viscous composition is irradiated through the transparent mold to cure the composition to a solid plastic sub-layer having the desired smooth or high-resolution featured surface. After irradiation of the composition, the master mold is removed, leaving the cured plastic sub-layer adhered to the substrate. The substrate is preferably metal, such as aluminum, and the master is preferably glass with an etched featured surface thereon.

15 Claims, 5 Drawing Figures

PRIOR ART

PRIOR ART

PRIOR ART

FABRICATING OPTICAL RECORD MEDIA

BACKGROUND OF THE INVENTION

1. Field of the Invention

The present invention relates generally to a record medium useful in optical reading and writing of high-density information, and more particularly to improved fabrication methods for optical disks.

2. Description of the Prior Art

Optical disk recording media have various configurations, and may be rigid or flexible. Rigid optical disks are made with either an optically clear plastic or glass substrate or a polished aluminum substrate. Plastics are generally used for low-capacity disks with low data rates, whereas aluminum and glass substrates are generally used for high-capacity, high-data-rate disks.

The currently preferred optical disk technology employs disk elements with spiral or concentric tracks of minute (usually on the order of a micron or less in size), optically detectable marks. One real-time mode of recording (writing) such marks is by scanning tracks on the disk with an equivalently small beam of radiation (e.g., from a laser), which is modulated "off" or "on" according to an electrical signal representative of the information to be written. Information is recovered (read) by scanning the tracks with a larger, but still very tightly focused, radiation (e.g., light) spot. The recovered information is in the form of a fluctuating electrical signal obtained from a photodetector that senses the read-out light reflected from the recorded disk.

In order to write and read information in the form of such minute markings, optical systems of high numerical aperture are used to focus light to equivalently minute spots. Such optical systems have extremely small depths of focus, and the proper positional relation between the writing or reading optical system and the optical disk record surface must be stringently maintained. Therefore it is highly desirable that the optical disk support surface underlying the record layer be smooth (i.e., relatively free of high-spatial-frequency variations from a nominal plane, e.g., minute pits or bumps) and flat (i.e., relatively free of large-amplitude, low-spatial-frequency variations, e.g., undulating surface variation of the support). Although complex focus-servo devices can effect lens adjustment to compensate for imperfect smoothness and flatness, such devices add to the cost and fragility of the write/read apparatus. The required complexity of the focus-servo devices is proportional to the degree of such disk imperfections and the speed of operation.

One approach to achieve requisite smoothness and flatness has been to form the disk substrate of glass with a ground and polished surface. That requires a time-consuming and costly fabrication procedure. Another approach is to start with a disk substrate with a generally smooth surface and apply a surface smoothing sub-layer by spin-coating techniques. Smoothing sub-layers applied by spin-coating techniques improve the surface characteristics, but still exhibit substantial high-spacial-frequency variations.

Besides the requirement for smoothness, most rigid optical disks require some tracking feature to be a permanent part of the disk. This is referred to as "preformatting" and is generally either a groove or an optically written data track. Grooving the disk is the fastest method, and for plastic substrates is done either during the process of molding the plastic substrate or during a subsequent sub-layer casting operation, such as the "2p" process described hereinafter. For aluminum substrates, tracking features are generally optically written onto disks, but that requires up to one hour for a two-sided, 14-inch-diameter disk.

Figure 1:
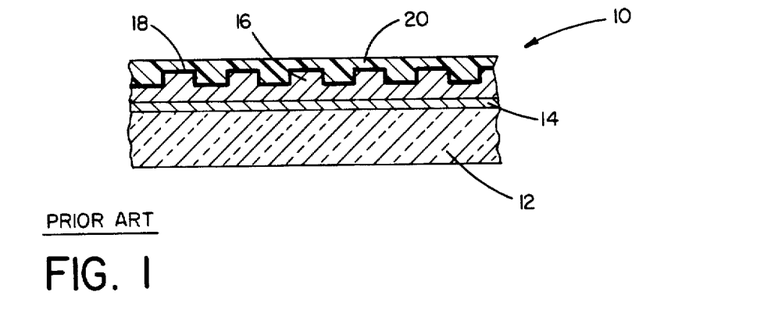
FIG. 1 is a sectional fragmental view of an optical disk in accordance with the prior art.

FIG. 1 is a cross-sectional view of a portion of a typical prior-art disk 10. Each disk half has a transparent substrate 12 coated on one side wth a primer layer 14 and a featured (i.e., having a pattern of depressions and/or protuberances), molded sub-layer 16. Sub-layer 16 may contain a data track containing video picture and sound information. A thin, reflective metal mirror coating 18 is applied to molded sub-layer 16 so that information may be read from the disk by optical reflection. The mirror coating is in turn coated with a protective layer 20.

Figure 2A:
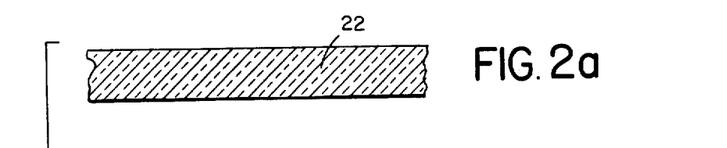
FIGS. 2a to 2g are a series of sectional fragmental views of a prior art manufacturing process for molds used in producing the optical disk shown in FIG. 1.
Figure 2B:
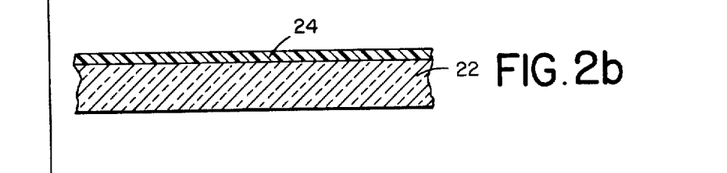
Figure 2C:
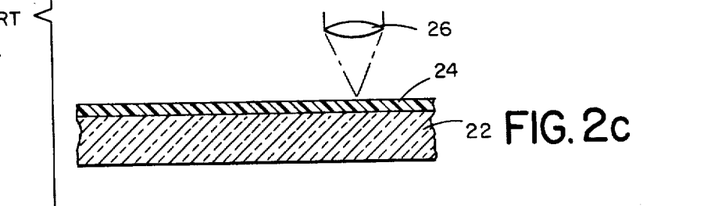
Figure 2D:
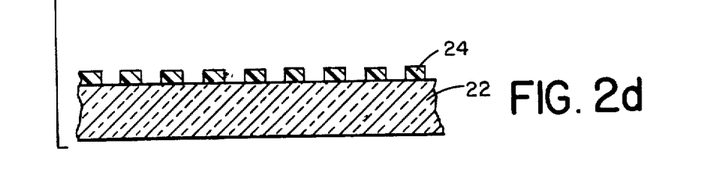
Figure 2E:
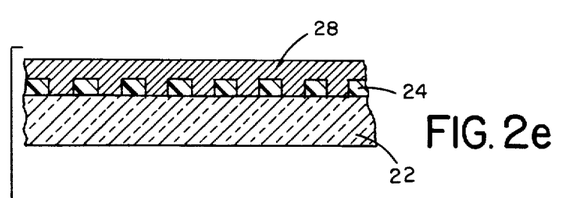
Figure 2F:
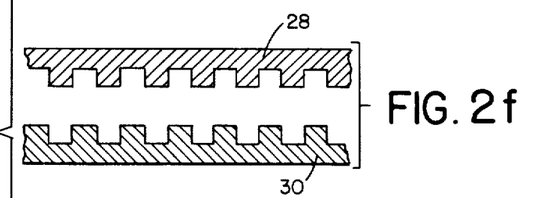
Figure 2G:
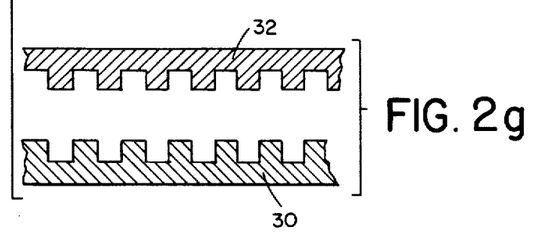

Manufacture of such known optical disks begins with the making of a mold. A typical mold-making process is shown in FIGS. 2a to 2g. A polished glass blank 22, FIG. 2a, is coated with a layer of photoresist 24, FIG. 2b. Picture and sound information is written onto the photoresist layer by means of modulated laser light focused by an optical system 26 (FIG. 2c) so that it is registered in the form of a pattern of voids in the developed photoresist layer (FIG. 2d). After application of a release layer (not shown), a thin nickel layer 28 (FIG. 2e) is electrochemically deposited onto the patterned side of the glass blank and is then removed to form a single metal negative copy of the vulnerable master, which is destroyed in the process, this copy being referred to in the industry as the "father." Electrochemical copying of the father produces a limited number (six or so) of "mother" copies 30 (FIG. 2f) before the father has deteriorated to the point that the resolution of additional mothers would be unsatisfactory. The mothers are positive copies of the master, and are themselves copied a limited number of times to produce negative "son" copies 32, shown in FIG. 2g. The sons are used as molds for mass production. This "family" process is necessary so that many production molds may be made from a single glass master mold. However, each generation of the family, and each succeeding member of the same generation, suffers increasing resolution degradation.

Several replication methods are usable with the molds which result from the previously described process. For example, optical disks may be molded by a compressive technique wherein a preheated plastic mass is forced against the featured mold under high pressure. The high pressure, temperature, and rate of cooling can cause some deformation of the mold so that local non-circularity of the tracks is introduced. There may also be residual stresses in the plastic, producing undesirable birefringence and/or a warped disk.

Another method for replicating disks involves injection molding. In this method, granulated plastic is melted and injected under pressure into a mold cavity. The disadvantages of this approach are comparable to those of compression molding.

In yet another replication method, a heated mold is used to impress the information at high pressure and temperature into the surface of a plastic disk at room temperature. In principle, only the surface of the disk is affected in this process. However, since it is difficult to obtain disks that are sufficiently flat, the disk must be preheated so that complete plastic deformation is possible, leading to the disadvantages mentioned earlier with respect to compression and injection molding.

Figure 3A:
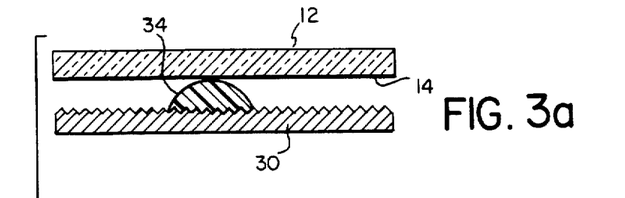
FIGS. 3a to 3d are a series of sectional fragmental views of a prior art manufacturing process for making the optical disk shown in FIG. 1.
Figure 3B:
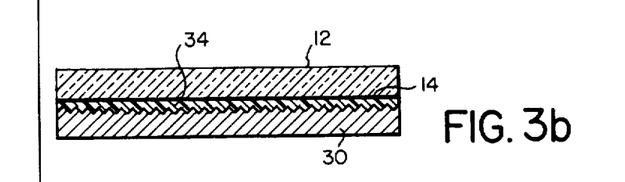
Figure 3C:
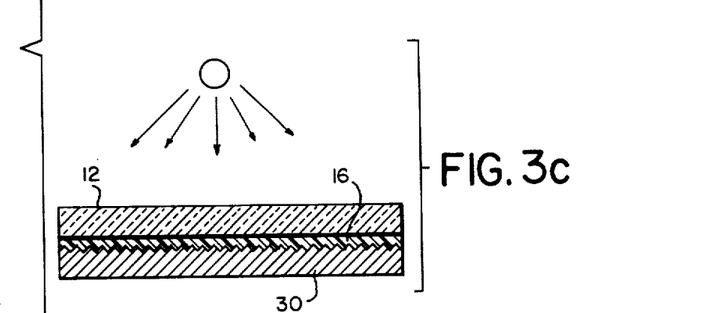
Figure 3D:
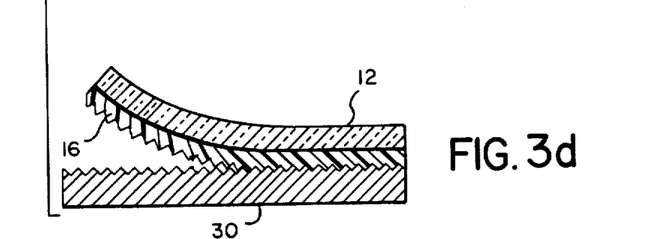

Still another method known in the prior art is based on a photopolymerization process, which is generally referred to as the "2p" process. In this process, a liquid composition of monomers of acrylates (esters of acrylic acid) is polymerized on a featured mold by exposure to ultraviolet radiation to form a featured sub-layer. FIGS. 3a to 3d illustrate steps in the 2p process. A few milliliters of the 2p liquid (34 in FIG. 3a) are applied to the center of a metal, featured mold 30 which has been prepared as described hereinbefore. A transparent substrate 12, coated on one side with a primer layer 14, is placed on the mold such that the space between the mold 30 and the coated substrate 12 is filled by a layer of 2p liquid 34 (FIG. 3b). This layer is exposed to ultraviolet light (FIG. 3c) to polymerize the 2p liquid and form sub-layer 16. The 2p material of sub-layer 16 does not adhere to the mold 30 but does adhere to the coated substrate 12; and after the exposure, the substrate and the cured record layer bonded thereto are removed from the mold as shown in FIG. 3d. A reflective metal mirror coating 18 and a protective layer 20 (FIG. 1) can then be applied to the sub-layer 16.

While the 2p process does not share the above-noted disadvantages inherent in the compression molding, injection molding, and embossing techniques, it does suffer from the resolution degradation which comes from making multiple-mold generations, and is usable only when the substrate is transparent to the radiation used to cure the 2p liquid.

Several materials have been proposed for the substrate used in the 2p process. Such materials include polymethyl methacrylate (PMMA), polyvinylchloride (PVC), and polycarbonate (PC). It has been found that aluminum disk substrates are more desirable than substrates of plastic material. Because a departure from flatness in the disk causes vertical displacement of the information track, any such departure complicates the read/write operations. Disk flatness can be better maintained with aluminum. Similar considerations apply to radial deviations of the information from the ideal. Compared to the three transparent materials proposed for the substrate of the 2p process, a disk substrate of metal material would be superior for holding tolerances.

Other problems exist for plastic substrates. PMMA is sensitive to moisture and requires an adhesion layer before application of the 2p material because cured 2p coating does not adhere well directly to a PMMA surface. Absorption of water vapor causes changes in the mechanical properties of PMMA, which can lead to warping of the disk. PVC has only marginally acceptable birefringence properties, exhibits dimensional stability vulnerability at high temperature, and is subject to attack of the mirror coating by additives and decomposition products. PC poses problems of birefringence, has a high molding temperature of about 140° C., and has a tendency to stress-crack when in contact with 2p liquid.

SUMMARY OF THE INVENTION

The present invention relates to an improved method for making a write-and-read optical disk having an opaque, substantially flat substrate and an extremely smooth sub-layer upon which a record layer may be applied. The sub-layer may be featured with a high-resolution pattern of depressions and/or protuberances.

The method entails the steps of injecting between an opaque, substantially flat substrate and a transparent, highly polished master mold, a thin layer of viscous composition which is radiation-curable to a solid plastic without undergoing significant shrinkage. The layer of viscous composition is irradiated through the transparent master mold to effect curing to a solid plastic sub-layer having the desired surface. After irradiation of the composition, the master mold is removed, leaving the cured sub-layer adhered to the substrate. In a preferred embodiment, the surface of the transparent master mold is provided with a high-resolution pattern of depressions and/or protuberances, whereby the sub-layer is produced with a featured surface. The substrate is preferably metal (such as aluminum), and the master mold is preferably glass with an etched pattern thereon.

The invention, and its objects and advantages, will become more apparent in the detailed description of the preferred embodiments presented below.

BRIEF DESCRIPTION OF THE DRAWINGS

The description of preferred embodiments refers to the attached drawings wherein.

DETAILED DESCRIPTION OF THE PREFERRED EMBODIMENTS

The manufacturing method described in this specification presents a process for making optical disks by molding a radiation-curable plastic sub-layer onto an aluminum disk, although other substrate materials may be used. Generally, the manufacturing process involves pretreating disks as described below, placing a clear glass master mold in spaced alignment with the substrate disk, interjecting a viscous radiation-curable composition between the glass master and the substrate disk, exposing the composition through the glass, and delaminating the master mold from the disk, leaving the sub-layer. Metal and other layers could be coated over the sub-layer.

MANUFACTURE OF THE MASTER MOLD

Figure 4A:
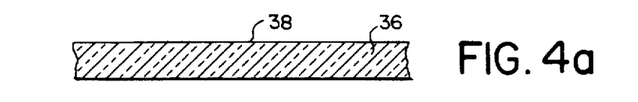
FIGS. 4a to 4h are a series of sectional fragmental views of a manufacturing process for molds in accordance with the present invention.

The master mold consists of a polished, flat glass plate with or without recessed information tracks etched into one surface. FIGS. 4a to 4h schematically show a preferred manufacturing process for the master. FIG. 4a illustrates a glass blank 36 which has been selected for its light transmission properties, absence of internal voids, and polishability. One surface 38 of blank 36 has been ground and polished, preferably to a finish with defects no larger than about 10 to 15 Å RMS and scratches of widths less than one micro inch.

Figure 4B:
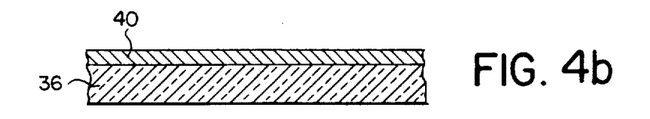
Figure 4C:
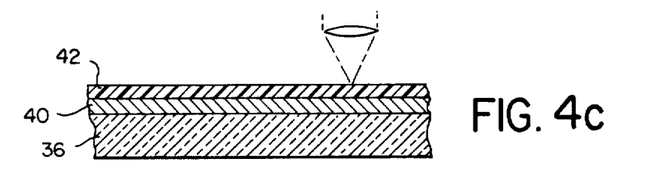

Referring to FIG. 4b, a thin layer 40 of chrome has been deposited on the polished surface. Preferably the chrome layer is from 800 Å to 1000 Å RMS thick and may be deposited by standard vacuum coating techniques. Other coating methods will readily occur to those skilled in the art. A positive working photoresist layer 42, such as Eastman Kodak Company resist KPR-820, is applied to the chrome layer such as by spin coating. The photoresist layer is dried and post-baked in accordance with usual application techniques. As shown in FIG. 4c, latent images are formed in the photoresist layer by focused light, i.e., laser light. The latent image may contain pre-formatting information for optical disks later to be recorded with data, or digital data may be recorded directly during this step.

Figure 4D:
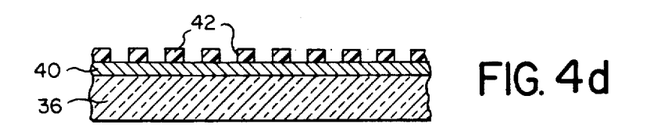
Figure 4E:
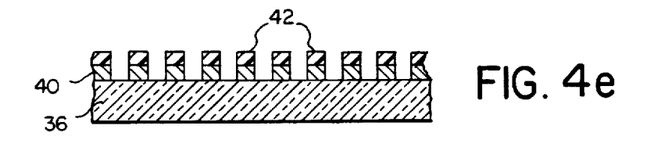
Figure 4F:
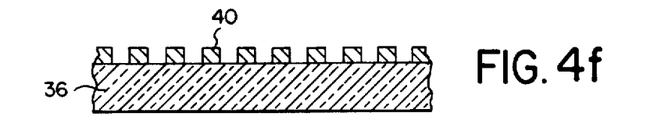

Various chemicals well known in the art are usable to develop resist layer 42 as shown in FIG. 4d. After the resist layer is developed, the portion of chrome layer 40 not protected by resist is etched down to glass blank 36 (FIG. 4e). FIG. 4f shows the glass and chrome pattern following removal of unexposed photoresist by a suitable solvent.

Figure 4G:
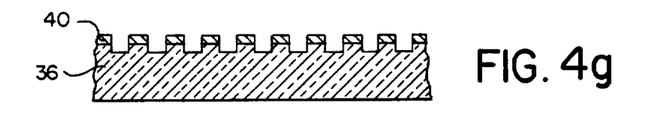
Figure 4H:
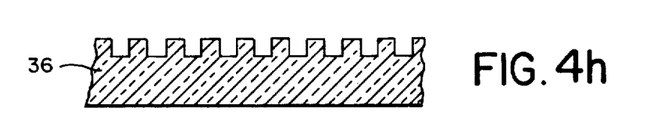

The glass blank with the chrome pattern (FIG. 4f) is placed in a vacuum coater. A plasma is established using argon gas at approximately $1.2 \times 10^{-3}$ torr. Radio frequency power is applied to the gas at 500 watts and 400–500 volts. Chromium is a sacrificial mask for plasma etching gas, and the plasma erodes away the glass and the chrome mask. Pattern depth is controlled by the thickness of the mask, the power, and the duration of etch. Depths of approximately 1000 Å RMS can be obtained with an etch time of one hour and a chromium thickness of 800 Å RMS. The rate at which the chromium erodes is about $\frac{1}{3}$ to $\frac{1}{2}$ slower than the glass. FIG. 4g shows the etched glass blank and chrome coating. FIG. 4h shows the glass master after chrome removal by a conventional acid. After the chrome has been removed, the master is optically clear and can transmit ultraviolet light.

THE SUBSTRATE

Optical disks in accordance with the present invention are preferably formed with an aluminum disk substrate. The substrate is phosphoric-acid anodized to increase adhesion of subsequent coatings to the aluminum. Typical aluminum substrates have surface finishes of at least 1000 Å RMS. This poor finish dictates the need for a smoothing layer.

MOLDING OPERATION

Figure 5A:
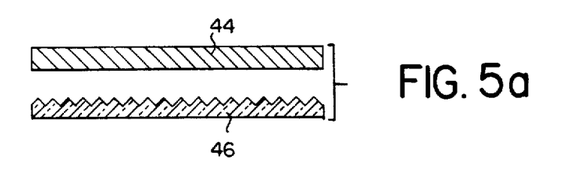
FIGS. 5a to 5e are a series of sectional fragmental views of a manufacturing process for making optical disks in accordance with the present invention.

Referring to FIGS. 5a to 5e, the molding process in accordance with one preferred embodiment of the present invention will be discussed. As shown in FIG. 5a, a rigid metal substrate 44 is aligned with and spaced from a featured glass master mold 46, which has been prepared, for example, in accordance with the process illustrated in FIGS. 4a to 4h. The gap between substrate 44 and master mold 46 is filled with a liquid molding resin 48 (FIG. 5b) which is radiation-polymerizable.

Figure 5B:
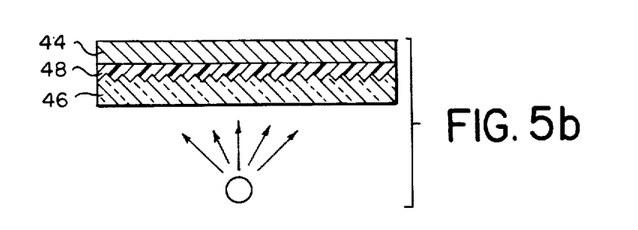

As shown in FIG. 5b, the resin is polymerized by ultraviolet light through transparent master mold 46. The light source may be a mercury-vapor lamp having a wave length of about 330 nm to 450 nm. If featured, the resultant sub-layer has a resolution on the order of 0.05 micro inch, and shrinkage is less than two percent.

Figure 5C:
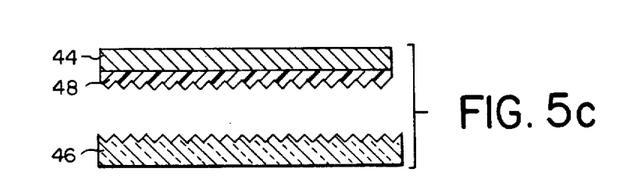
Figure 5D:
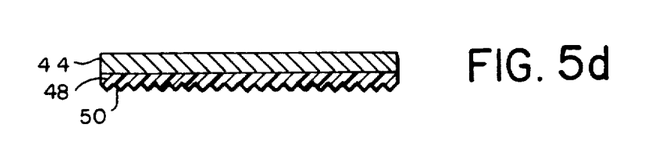
Figure 5E:
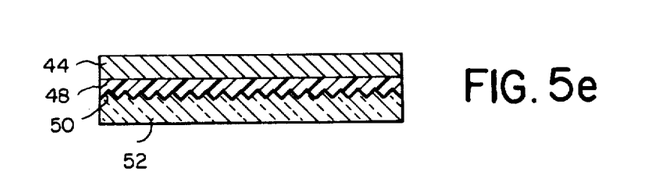

The polymerized resin adheres to the substrate but not to the glass master, which can be parted from the resin as shown in FIG. 5c. The featured surface of the resin can be coated with various layers such as a metal mirror or record layer 50 (FIG. 5d) and a protective transparent layer 52 (FIG. 5e).

The invention has been described in detail with particular reference to certain preferred embodiments thereof, but it will be understood that variations and modifications can be effected within the spirit and scope of the invention.

What is claimed is:

1. A process for making at least a single-faced, optical wire and/or read recording disk having a sub-layer with a desired high-resolution featured surface, comprising the steps of:
   coating a polished surface of a glass blank with a continuous metal coating;
   applying a layer of photoresist material to said metal coating;
   exposing said photoresist layer so as to create therein a latent image of a desired pattern;
   developing said latent image, leaving some portions of said metal coating uncovered and other portions thereof covered by remaining portions of said photoresist layer;
   etching away said uncovered portions of said metal coating, leaving corresponding portions of said glass blank uncovered and other portions thereof still covered by said other portions of said metal coating covered by remaining portions of said photoresist layer;
   removing said remaining portions of said photoresist layer from said other portions of said metal coating;
   plasma etching into said uncovered portions of said glass blank while said other portions thereof remain covered by said other portions of said metal coating;
   removing said other portions of said metal coating from said other portions of said glass blank, thereby leaving a transparent glass master mold that is featured in relation to said desired pattern;
   positioning an opaque substantially flat metal substrate in spaced alignment with said transparent featured glass master mold so as to define a thin gap therebetween;
   filling said gap with a viscous composition that is radiation-curable to a solid plastic without undergoing significant shrinkage;
   irradiating said composition through said glass master mold so as to cure said composition to a solid plastic sub-layer having said desired high-resolution featured surface; and
   removing said glass master mold, leaving said plastic sub-layer adhered to said metal substrate.

2. A process as defined in claim 1 wherein said metal substrate comprises an aluminum disk.

3. A process as defined in claim 2 further comprising the step of anodizing said aluminum disk before said positioning step.

4. A process for making at least a single-faced, optical wire and/or read recording disk having a sub-layer with a desired high-resolution featured surface, comprising the steps of:
   producing a mask pattern on a surface of a glass blank;
   plasma etching into said glass blank where it is not masked and then removing said mask to form a transparent featured glass master mold;
   placing an opaque substantially flat metal substrate in spaced alignment with said glass master mold so as to form a thin gap therebetween;

filling said gap with a viscous composition that is radiation-curable to a solid plastic without undergoing significant shrinkage;

irradiating said composition through said glass master mold so as to cure said composition to a solid plastic sub-layer having said desired high-resolution featured surface; and removing said glass master mold, leaving said plastic sub-layer adhered to said metal substrate.

5. A process as defined in claim 4 wherein said mask pattern is produced by etching away selected areas of a continuous chrome coating on said surface of said glass blank.

6. A process as defined in claim 4 wherein said mask comprises chrome, and said plasma etching step is effected by argon gas.

7. A process as defined in claim 4 wherein said metal substrate comprises an aluminum disk.

8. A process as defined in claim 7 wherein said aluminum disk is anodized before said placing step.

9. A process as defined in claim 1 wherein said metal coating comprises chrome.

10. A process as defined in claim 1 wherein said metal coating is vacuum coated, and is about 800 Å to 1000 Å thick.

11. A process as defined in claim 10 wherein said metal coating comprises chrome.

12. A process as defined in claim 1 wherein said plasma etching step is done with argon gas.

13. A process as defined in claim 12 wherein said metal coating comprises chrome.

14. A process as defined in claim 1 wherein said photoresist material is positive working, and said layer thereof is applied by spin coating.

15. A process as defined in claim 1 wherein said exposing step is done by focused laser light.

* * * * *

UNITED STATES PATENT AND TRADEMARK OFFICE
CERTIFICATE OF CORRECTION

PATENT NO. : 4,619,804
DATED : October 28, 1986
INVENTOR(S) : Leonard et al.

It is certified that error appears in the above-identified patent and that said Letters Patent are hereby corrected as shown below:

Col. 4, line 1 "injecting" should read -- interjecting --

Col. 6, line 8 "wire" should read -- write --

Col. 6, line 58 "wire" should read -- write --

Signed and Sealed this

Twenty-first Day of April, 1987

Attest:

DONALD J. QUIGG

Attesting Officer

Commissioner of Patents and Trademarks